(12) United States Patent
Ranganathan et al.

(10) Patent No.: US 11,640,573 B2
(45) Date of Patent: May 2, 2023

(54) INTELLIGENT SCORING MODEL FOR ASSESSING THE SKILLS OF A CUSTOMER SUPPORT AGENT

(71) Applicant: Dell Products L. P., Round Rock, TX (US)

(72) Inventors: Karthik Ranganathan, Round Rock, TX (US); Sathish Kumar Bikumala, Round Rock, TX (US); David Thomas Kirkpatrick, Cedar Park, TX (US); Tejas Naren Tennur Narayanan, Austin, TX (US); Shalu Singh, Austin, TX (US); Amit Sawhney, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 16/942,296

(22) Filed: Jul. 29, 2020

(65) Prior Publication Data

US 2022/0036277 A1 Feb. 3, 2022

(51) Int. Cl.
*G06Q 10/06* (2012.01)
*G06Q 10/0639* (2023.01)
(Continued)

(52) U.S. Cl.
CPC ......... *G06Q 10/06393* (2013.01); *G06N 5/04* (2013.01); *G06N 20/00* (2019.01);
(Continued)

(58) Field of Classification Search
CPC ....... G06Q 10/06393; G06Q 10/06398; G06Q 10/1091; G06Q 30/016; G06Q 50/2057;
(Continued)

(56) References Cited

U.S. PATENT DOCUMENTS

| 7,191,133 B1 * | 3/2007 | Pettay | G06Q 10/06398 |
| | | | 379/265.06 |
| 2008/0077470 A1 * | 3/2008 | Yamanaka | G06Q 10/06 |
| | | | 705/7.31 |

(Continued)

OTHER PUBLICATIONS

Contact Center Leaders Confident in Artificial Intelligence's (AI's) Role in Delivering Exceptional Customer Experiences Business Wire [New York] May 1, 2019.*

(Continued)

*Primary Examiner* — Timothy Padot
(74) *Attorney, Agent, or Firm* — Krishnendu Gupta; Deepika Bhayana; Derek Lam (57) ABSTRACT

Systems and methods for assessing the skills of a customer support agent using one or more Artificial Intelligence/Machine Learning (AI/ML) models are disclosed. In at least one embodiment, one or more benchmarks against which the performance of the customer support agent is to be measured are established. The one or more benchmarks may be derived through direct and/or indirect analysis of historical customer service data by an AI/ML benchmark model. In at least one embodiment, data relating to performance of the customer support agent during a customer call is monitored. In at least one embodiment, the AI/ML benchmark model is used to determine one or more benchmark scores identifying whether the customer support agent is meeting the one or more benchmarks.

20 Claims, 9 Drawing Sheets

(51) Int. Cl.

| | |
|---|---|
| *G06Q 30/016* | (2023.01) |
| *G06Q 50/20* | (2012.01) |
| *G06Q 10/1091* | (2023.01) |
| *G06N 20/00* | (2019.01) |
| *G09B 19/00* | (2006.01) |
| *G10L 25/63* | (2013.01) |
| *G10L 15/22* | (2006.01) |
| *G10L 25/78* | (2013.01) |
| *H04M 3/51* | (2006.01) |
| *G06N 5/04* | (2023.01) |
| *G06Q 10/0631* | (2023.01) |

(52) U.S. Cl.
CPC ... *G06Q 10/06398* (2013.01); *G06Q 10/1091* (2013.01); *G06Q 30/016* (2013.01); *G06Q 50/2057* (2013.01); *G09B 19/00* (2013.01); *G10L 15/22* (2013.01); *G10L 25/63* (2013.01); *G10L 25/78* (2013.01); *H04M 3/51* (2013.01); *G06Q 10/06316* (2013.01)

(58) Field of Classification Search
CPC .... G06Q 10/06316; G06N 20/00; G06N 5/04; G09B 19/00; G10L 15/22; G10L 25/63; G10L 25/78; H04M 3/51
USPC ........................................................ 705/7.39
See application file for complete search history.

(56) References Cited

U.S. PATENT DOCUMENTS

| | | | | |
|---|---|---|---|---|
| 2008/0240404 | A1* | 10/2008 | Conway | H04M 3/5175 |
| | | | | 379/212.01 |
| 2013/0018651 | A1* | 1/2013 | Djordjevic | G06Q 10/00 |
| | | | | 704/9 |
| 2013/0176413 | A1* | 7/2013 | Lowry | G06Q 10/06398 |
| | | | | 379/265.06 |
| 2015/0264177 | A1* | 9/2015 | Feast | G10L 25/48 |
| | | | | 379/265.07 |
| 2017/0147941 | A1* | 5/2017 | Bauer | G06N 20/10 |
| 2018/0124243 | A1* | 5/2018 | Zimmerman | H04M 3/5133 |
| 2018/0129978 | A1* | 5/2018 | Vigoda | G06N 7/005 |
| 2019/0340533 | A1* | 11/2019 | Copper | G06N 3/088 |
| 2020/0111377 | A1* | 4/2020 | Truong | G09B 5/12 |
| 2020/0226519 | A1* | 7/2020 | Karthik | G06Q 10/04 |

OTHER PUBLICATIONS

Genesys Introduces Advanced Reporting to Analyze Contact Center Efficiency and Performance. Business Wire Dec. 8, 1999.*
Contact Center Leaders Confident in Artificial Intelligence's (AI's) Role in Delivering Exception Customer Experiences. Business Wire [New York] May 1, 2019.*
Call center checkup. Read, Brendan B. Call Center Magazine; Jun. 2003; 16, 6; ProQuest Central p. 26.*

* cited by examiner

INTELLIGENT SCORING MODEL FOR ASSESSING THE SKILLS OF A CUSTOMER SUPPORT AGENT

BACKGROUND OF THE INVENTION

Field of the Invention

The present disclosure relates to the intelligent assessment of the skills of customer support agents and, more particularly, assessment of the skills of a customer support agent using Artificial Intelligence (AI) and/or Machine Language (ML) to assess the skills.

Description of the Related Art

As the value and use of information continue to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One environment in which IHS are used is in customer support centers. The IHS in customer support centers allow customer support agents to interact with customers to address issues that the customers are having.

SUMMARY OF THE INVENTION

A system of one or more computers can be configured to perform particular operations or actions by virtue of having software, firmware, hardware, or a combination of them installed on the system that in operation causes or cause the system to implement an intelligent scoring model for assessing the skills of a customer support agent. In certain embodiments, the skills of the customer support agent are assessed using one or more Artificial Intelligence/Machine Learning (AI/ML) models that provide benchmarks against which the performance of the customer support agent is to be measured. The one or more benchmarks may be derived directly and/or indirectly through an analysis of historical customer service data by the AI/ML benchmark model. Data relating to the performance of the customer support agent during a customer call may be monitored. The AI/ML benchmark model is used to determine one or more benchmark scores identifying whether the customer support agent is meeting the one or more benchmarks. Other embodiments of this aspect include corresponding computer systems, apparatus, and computer programs recorded on one or more computer storage devices, each configured to perform the actions of the methods.

Certain embodiments include applying the one or more benchmark scores of the customer support agent to an AI/ML training model to identify types of training needed by the customer support agent to meet the one or more benchmark scores. Certain embodiments include where at least one of the benchmark scores corresponds to a voice analytics score assessing vocal interactions between the customer support agent and a customer in the customer call. In certain embodiments, the establishment of the one or more benchmarks includes, providing historical data to an AI/ML historical analysis model, where the AI/ML historical analysis model executes unsupervised learning operations; identifying clusters of data provided by the AI/ML historical analysis model, applying a linear regression analysis to the identified clusters, and classifying one or more of the identified clusters for use in training the AI/ML benchmark model. In certain embodiments, the one or more benchmarks include, time taken by the customer support agent to complete an introductory phase of the customer call, the time taken by the customer support agent to follow a process path, where the process path includes processes to lead the customer support agent through interactions intended to resolve issues presented in the customer call, and the time taken by the customer support agent to close the customer call after solid the issues of the customer. Implementations of the described techniques may include hardware, a method or process, or computer software on a computer-accessible medium.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Certain embodiments of the disclosed system are implemented with a recognition that training programs are often standard across all customer support agents. Support agents are typically trained in groups, and it is difficult to measure the effectiveness of those training programs. Certain embodiments of the disclosed system are implemented with a recognition that individual assessment of support agent performance is more effective than a group assessment of multiple customer agents. In at least one embodiment, an intelligent benchmark is obtained to define customer support parameters that measure the quality and effectiveness of the customer support agent's skills. In at least one embodiment, data needed to compare the quality and effectiveness of the customer support agent is acquired over the course of one or more customer calls handled by the customer support agent. The data acquired during the customer calls may be measured against the benchmark to determine whether the customer support agent is providing high-quality service in a timely manner. If the customer support agent does not meet one or more of the established benchmarks, certain embodiments of the disclosed system suggest remedial action in those areas where the skills of the customer support agent are lacking.

Figure 1:
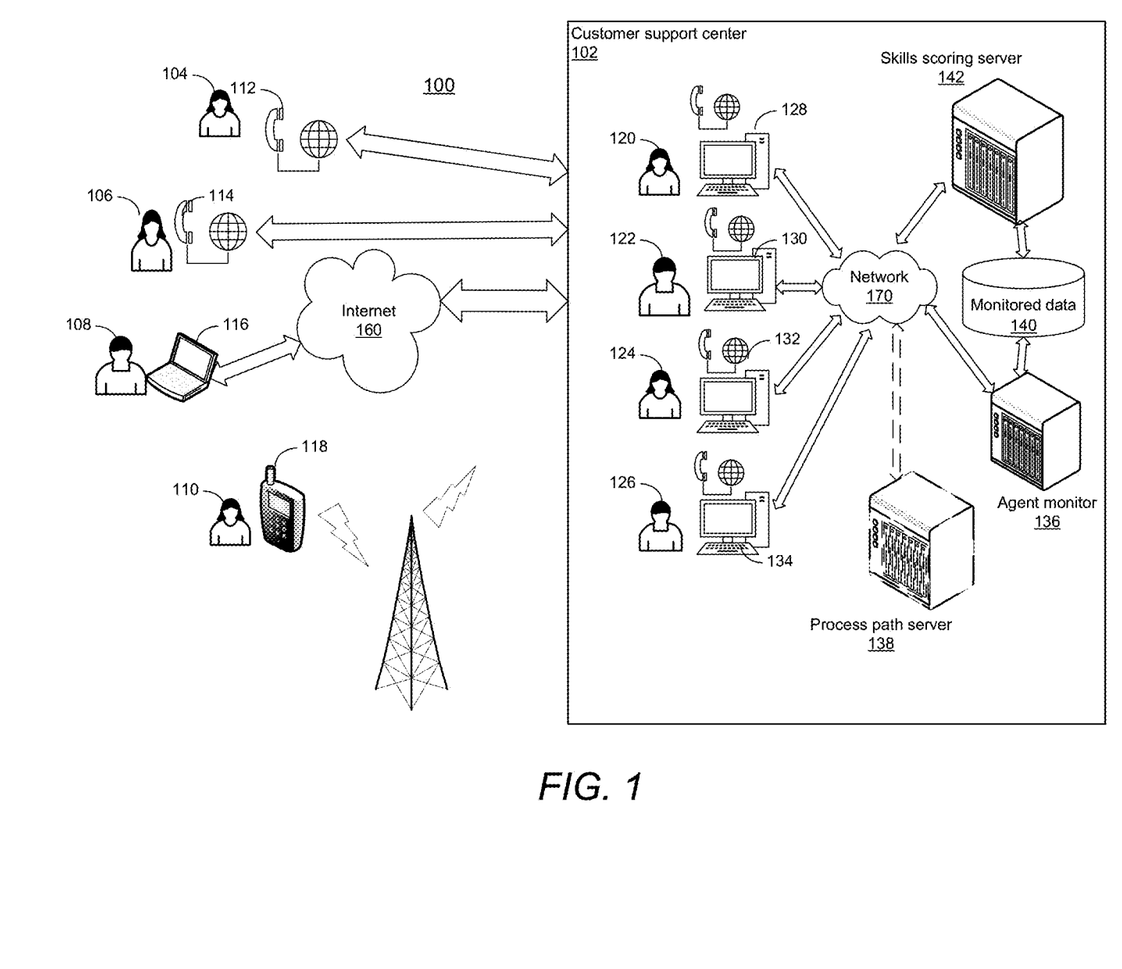
FIG. 1 depicts an electronic environment in which certain embodiments of the disclosed system may operate.

FIG. 1 depicts an electronic environment 100 in which certain embodiments of the disclosed system may operate. The example shown in FIG. 1 includes a customer support center 102. The customer support center 102 may be localized at a single physical facility and or distributed across multiple physical facilities. Accordingly, the elements shown in FIG. 1 need not be organized in the manner set forth in FIG. 1.

In the example shown in FIG. 1, a plurality of different customers 104, 106, 108, and 110 are in communication with the customer support center 102 through varying communication channels. Here, customers 104 and 106 are in communication with the customer support center 102 using a plain old telephone services 112 and 114, customer 108 is in communication with the customer support center 102 using a laptop 116 over the Internet 160, and customer 110 is in communication with the customer support center 102 using a smartphone 118.

The customer support center 102 shown in FIG. 1 includes a plurality of customer support agents 120, 122, 124, and 126, each having a respective communication equipment 128, 130, 132, and 134. In at least one embodiment, the customer support center 102 includes an agent monitor 136 in communication with communication equipment 128, 130, 132, and 134 over a network 170, such as a wireless network, a wired network, the Internet, a local area network, a wide area network, etc.

Certain embodiments of the agent monitor 136 keep track of data relating to the performance of each customer support agent 120, 122, 124, and 126. Among other things, the agent monitor 136 keeps track of data relating to the time it takes each agent to handle various portions of the customer interactions. Additionally, or in the alternative, the agent monitor 136 keeps track of data relating to the ability of the customer support agent to identify customer issues and guide the customer to acceptable resolutions. Additionally, or in the alternative, the agent monitor 136 keeps track of data relating to the ability of an agent to traverse predetermined customer resolution paths defined in a process path server 138. Additionally, or in the alternative, the agent monitor 136 keeps track of data relating to the vocal interactions between the customer and the customer support agent to assess the ability of the customer support agent to properly handle oral communications with the customer. The agent monitor 136 may monitor more properties or fewer properties relating to the interaction between the customer support agent and the customer, the foregoing being examples.

Agent monitor 136 may store the monitored data in monitored data datastore 140, which is also accessible to a skills scoring server 142. In certain embodiments, the agent monitor 136 may execute pre-processing operations on the monitored data to prepare the data for use by the skills scoring server 142. Additionally, or in the alternative, the agent monitor 136 may store raw data in the monitored data datastore 140 for use by the skills scoring server 142, where the skills scoring server 142 processes the raw data retrieved from the monitored data datastore 140.

In certain embodiments, the skills scoring server 142 retrieves the data a customer support agent from the monitored data datastore 140. The data for the customer support agent is subject to analyses using one or more AI/ML models to provide one or more agent scores. The scores of the customer support agent are compared against AI/ML determined benchmarks to determine whether the customer support agent's meeting benchmark requirements or in need of remedial training. In certain embodiments, the scores of the customer support agent are subject to AI/ML operations to identify the specific remedial training that the customer support agent should engage in to improve the customer support agent's performance.

Figure 2:
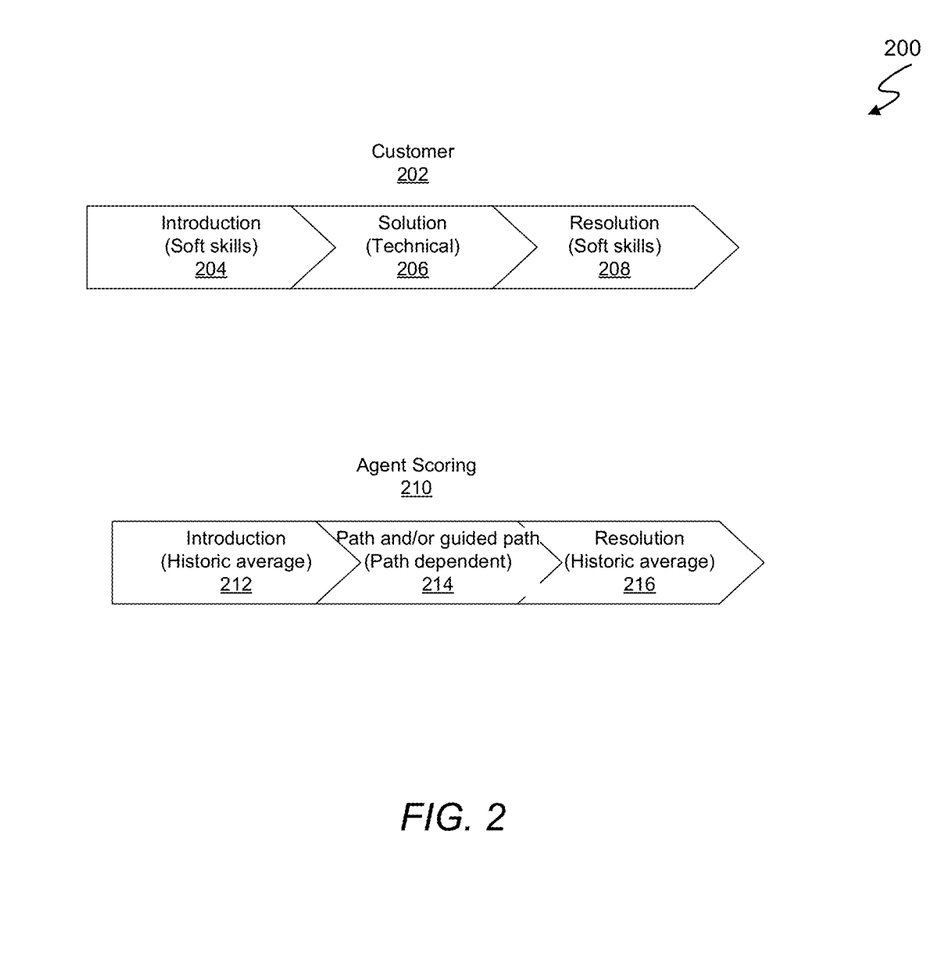
FIG. 2 depicts a general flow of a process call between a customer support agent and a customer.

FIG. 2 depicts a general flow of a customer call 200 between a customer support agent and a customer. In a general sense, some embodiments may assign scores to the customer support agent based on the performance of the customer support agent in each of the areas of interaction.

In the example shown in FIG. 2, certain embodiments view the customer call from different points of view. In certain embodiments, the customer 202 perceives the call in a flow of three logical steps. In this example, the customer 202 experiences an introduction interaction with the customer support agent at 204. The corresponding introductory interaction for agent scoring 210 is shown at 212. Introductory interactions often include a script that is to be used by the customer support agent, cordial interactions between the customer support agent and the customer, and other interactions requiring interpersonal communication skills on the part of the customer support agent. Benchmarks may be set for the introduction interaction and compared against the scores of the customer support agent in the introduction interaction to assess any deficiency on the part of the customer support agent.

From the customer's point of view, the customer is seeking a technical solution 206 to the customer's issue. During this phase of the communication, the customer 202 describes problems that the customer is facing. In certain embodiments, the customer support agent identifies the customer's issues and traverses a process path at 214 that is designed to address and resolve the identified issues. During this phase of the communication, the customer support agent must exercise the technical skills needed to address the customer's issues. Benchmarks may be set for solving technical solutions and compared against the scores of the customer support agent in the area of technical solutions to assess any deficiencies on the part of the customer support agent.

From the customer's point of view, the customer experiences a resolution of the customer's issue 208. During this phase of the interaction, the customer support agent exercises interpersonal skills to close out the customer call. Benchmarks may be set for the resolution interaction and compared against the scores of the customer support agent in the resolution interaction to assess any deficiency of the customer support agent in these areas.

Figure 3:
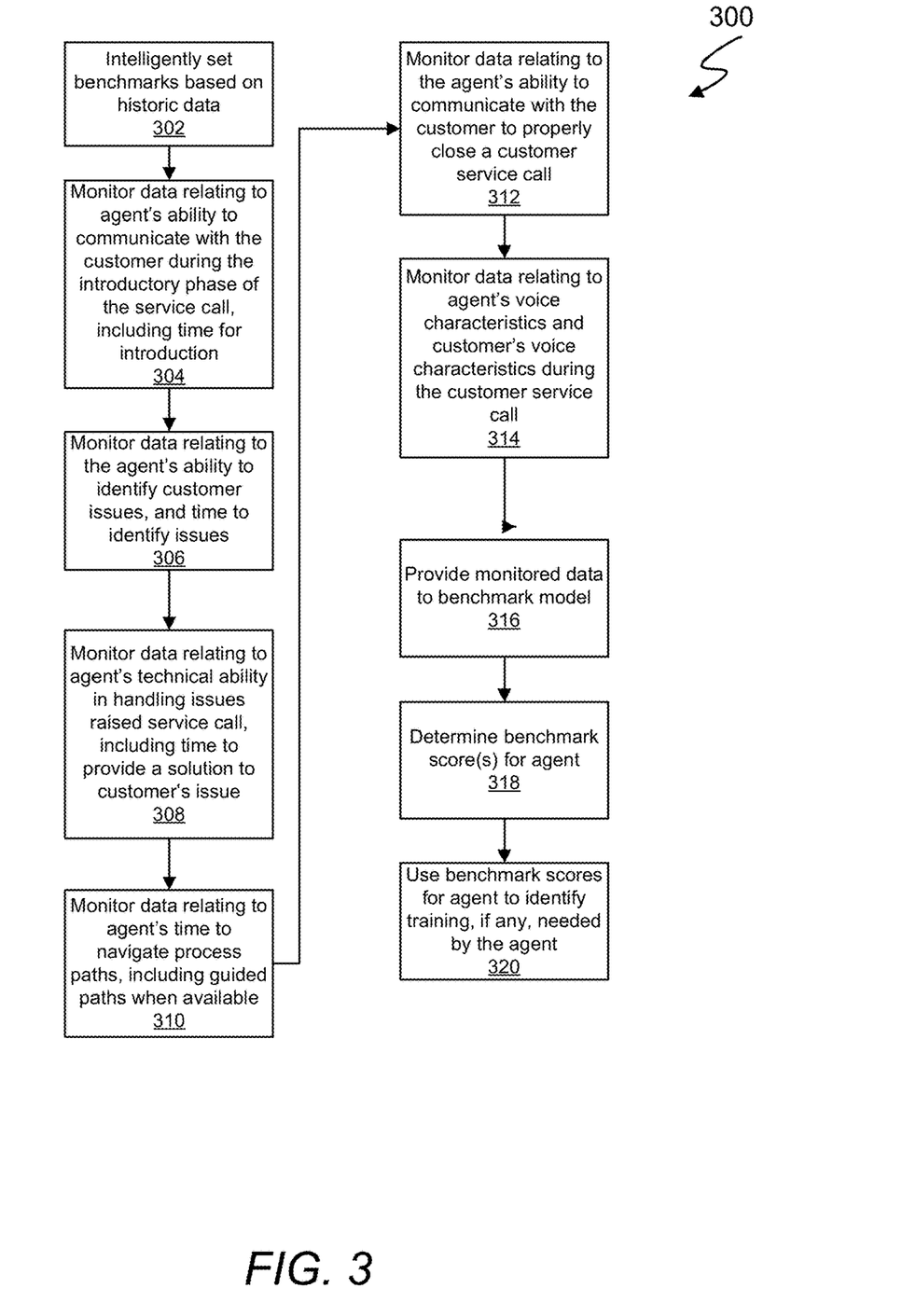
FIG. 3 is a flowchart showing exemplary operations that may be executed in certain embodiments of the disclosed system.

FIG. 3 is a flowchart 300 showing exemplary operations that may be executed in certain embodiments of the disclosed system. In FIG. 3, benchmarks for the performance of customer support agents are intelligently set based on historical data. In certain embodiments, the historical data includes data relating to how issues were handled, how quickly issues were identified, how long it takes customer support agents to resolve customer issues, etc.

Certain embodiments of the disclosed system continue to monitor data relating to the benchmarks set in operation 302. In certain embodiments, the data is monitored for each individual customer support agent to provide an assessment of the performance of the individual customer support agents. In certain embodiments, the data is monitored and assessed across multiple customer calls and by the customer support agent. At 304, certain embodiments monitor the data relating to the customer support agent's ability to communicate with the customer during the introductory phase of the service call, including the time for the introduction. At 306, certain embodiments monitor data relating to the customer support agent's ability to identify customer issues and the time to identify the issues. At 308, certain embodiments monitor the data relating to the customer support agent's technical ability in handling issues raised in the service call, including the time to provide a solution to the customer's issue. At operation 310, certain embodiments monitor data relating to the customer support agent's time to traverse a process path, including, when available, guided paths and time to traverse such paths. At 312, certain embodiments monitor the data relating to the customer support agent's ability to communicate with the customer to properly close a customer service call. At 314, certain embodiments monitor the data relating to customer support agent's voice characteristics as well as the customer's invoice characteristics during the customer call.

In certain embodiments, at least some of the monitored data for the customer support agent is provided to an AI/ML benchmark model. The scores for the customer support agent are determined at 318 by the AI/ML benchmark model. At 320, the benchmark scores for the customer support agent are used to identify remedial training, if any, needed by the customer support agent. In certain embodiments, the benchmark scores for the customer support agent are provided to a trained AI/ML recommendation model, which identifies the optimal training classes, programs, self-study, etc., for the customer support agent.

Figure 4:
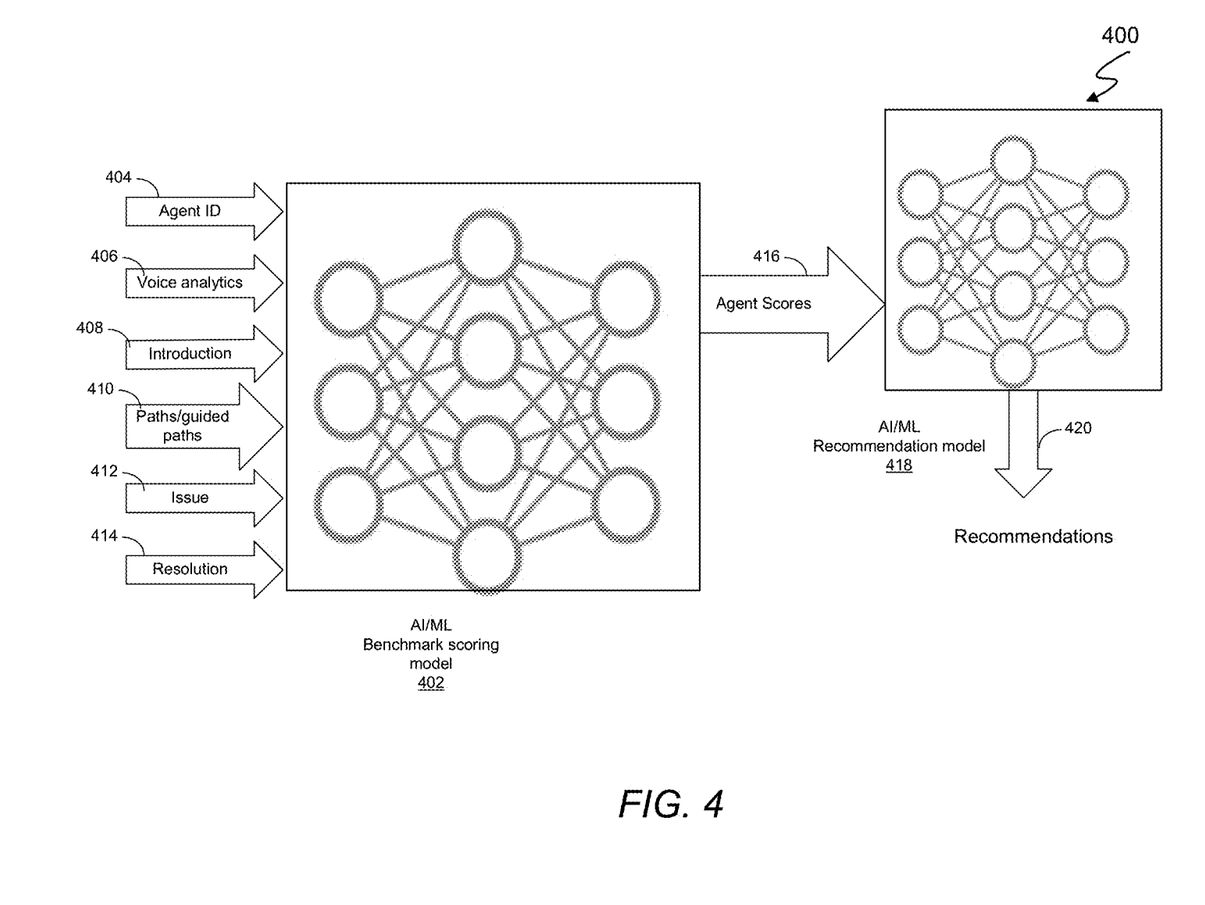
FIG. 4 is a functional block diagram depicting one manner of operating an AI/ML benchmark scoring model.

FIG. 4 is a functional block diagram 400 depicting one manner of operating an AI/ML benchmark scoring model 402. In the illustrated example, the AI/ML benchmark scoring model 402 has already been trained using historic customer interaction data and is ready to receive data relating to an individual customer support agent. Certain embodiments may provide an identification of the customer support agent, shown here as the Agent ID 404, and submit the identification to the AI/ML benchmark scoring model 402. Additionally, or in the alternative, the identity of the customer support agent may be accessed external to the AI/ML benchmark scoring model 402.

Other data that may be provided to the AI/ML benchmark scoring model 402 includes data relating to voice analytics 406 executed during the customer call. Data relating to the introductory phase 408, including the time spent by the customer support agent in the introductory phase of the customer call may also be provided to assess various communication interactions of the customer support agent with the customer. At 410, data relating to the customer support agent's ability to traverse the paths, including guided paths, and time to traverse the paths are provided to the AI/ML benchmark scoring model 402. At 412, data relating to the customer support agent's ability to identify issues, the difficulty of the issues addressed by the customer support agent, time to identify the issues, etc., are provided to the AI/ML benchmark scoring model 402. At 414, data relating to the resolution of the issues of the customer are provided to the AI/ML benchmark scoring model 402. The data provided at 414 may include, for example, whether the issues were resolved, the time taken to resolve the issues, the time taken to close out the customer call, etc.

Certain embodiments of the disclosed system may include an AI/ML recommendation model 418. In certain embodiments, the AI/ML recommendation model 418 is configured to receive the scores 416 of the customer support agent and recommend remedial training options 420 for the customer support agent, if any.

Figure 5:
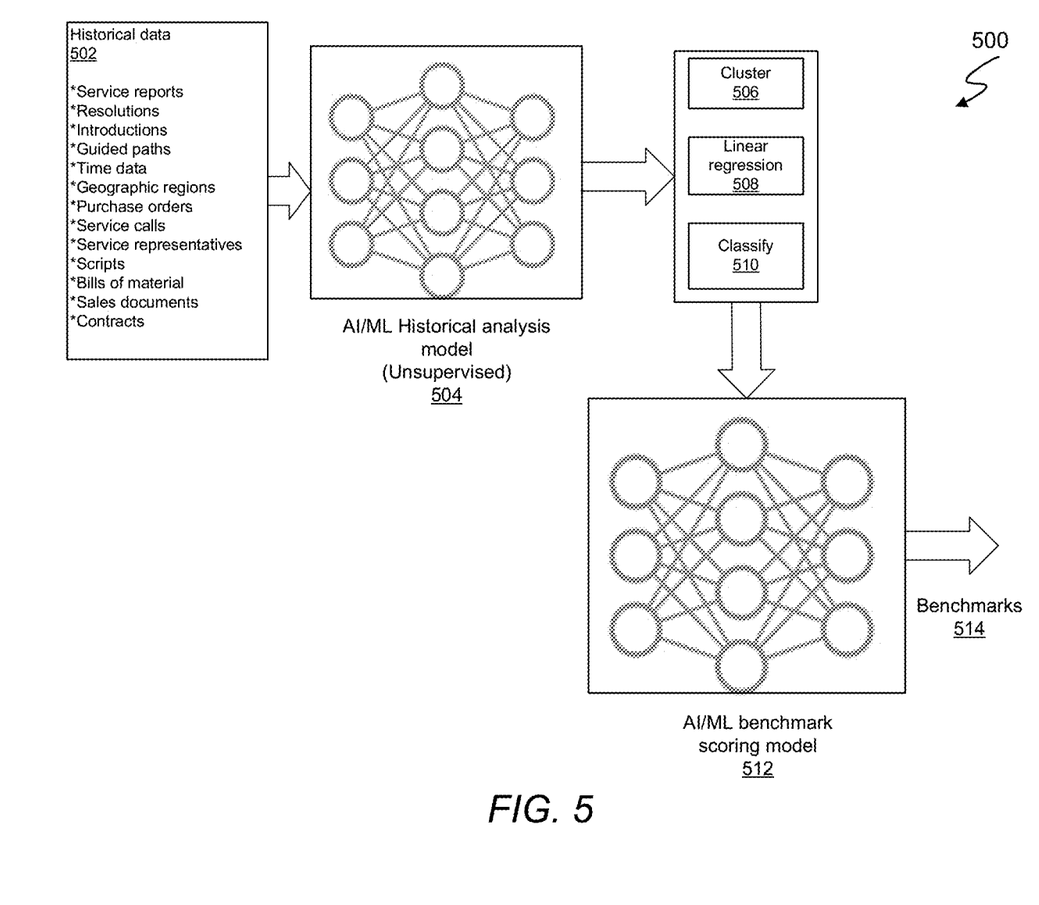
FIG. 5 is a functional diagram showing one manner in which certain embodiments train an AI/ML benchmark scoring model from historical data.

FIG. 5 is a functional diagram 500 showing one manner in which certain embodiments train an AI/ML benchmark scoring model 512 from historical data. In this example, historical data 502 is retrieved for input to the AI/ML historical analysis model 504. In certain embodiments, the historical data 502 is not labeled and, therefore, the AI/ML historical analysis model 504 analyzes the historical data in an unsupervised manner. Historical data 502 may include a range of data input types. In the example shown in FIG. 5, the historical data includes, but is not limited to, 1) service reports, 2) resolution reports, 3) time and content data relating to introductions, 4) guided paths and the time to traverse the guided paths, 5) geographic regions, 6) purchase orders, 7) service calls, 8) service representatives, 9) scripts, 10) bills of material, 11) sales documents, 12) contracts, etc.

AI/ML historical analysis model 504 executes unsupervised learning operations on the historical data 502. The data obtained from the AI/ML historical analysis model 504 may be clustered 506, subject to linear regression operations 508, and classified 510. Feature engineering operations may be conducted to narrow down the classifications that will be used to train the AI/ML benchmark scoring model 512. The AI/ML benchmark scoring model 512 is trained to provide benchmarks 514 for customer support agent performance.

Certain embodiments employ voice analytics to assess customer support agent performance. In certain embodiments, audio information from a customer call is stored and assessed on both a digital expression level and Natural Language Processing level. At the digital expression level, emphasis, volume, etc., can be used to assess the personal qualities of the interaction with the customer. At a Natural Language Processing level, the digital audio may be processed to determine the verbal content of the communication.

Figure 6:
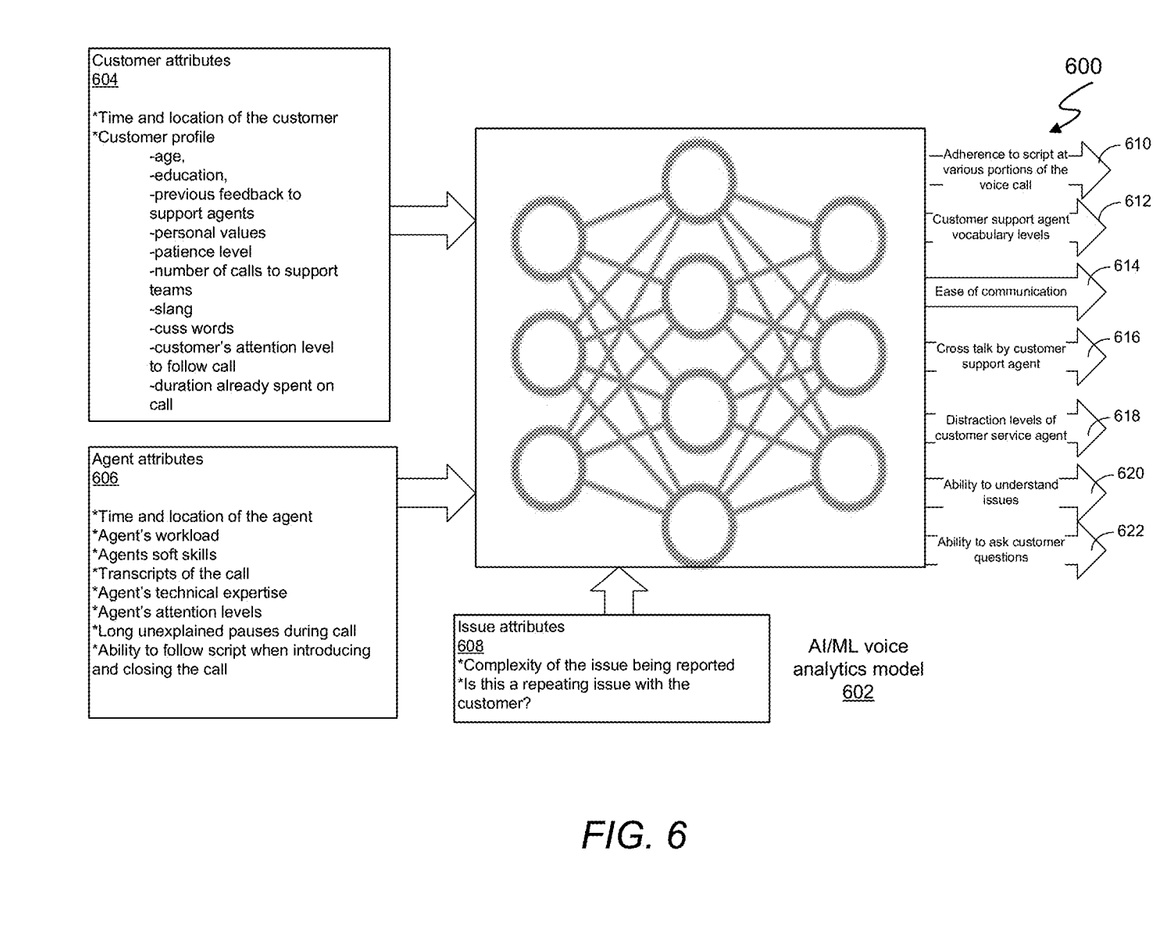
FIG. 6 is a functional diagram showing the training and use of an AI/ML voice analytics model used in certain embodiments of the disclosed system.

FIG. 6 is a functional diagram 600 showing the training and use of an AI/ML voice analytics model 602 in certain embodiments of the disclosed system. In the example shown in FIG. 6, the AI/ML voice analytics model 602 receives data relating to customer attributes 604, data relating to the attributes 606 of the customer support agent, and issues that may affect communications between the customer support agent and the customer, shown here as issue attributes 608.

FIG. 6 depicts a wide range of customer attributes 604 that may be used by the AI/ML voice analytics model 602. In certain embodiments, the customer attributes may include the time and location of the customer as well as customer profile information. Exemplary customer profile information, if available, includes, 1) age, 2) education, 3) previous feedback to support agents, 4) personal values, 5) patience level, 6) the number of calls to support teams, 7) slang, 8) cuss words, 9) customer's attention level in following the call, and 10) duration already spent on the call.

FIG. 6 also depicts a wide range of agent attributes that may be used by the AI/ML voice analytics model 602. In certain embodiments the agent attributes may include, for example, 1) time and location of the agent, 2) the agent's workload, 3) agent's soft skills, 4) transcripts of the call, 5) agent's technical expertise, 6) agent's attention levels, 7) long unexplained pauses during a call, and 8) the ability of the agent to follow the script when introducing and closing the call.

FIG. 6 also depicts issue attributes 608 that may be pertinent to the communication between the customer support agent in the customer. In the example shown in FIG. 6, the issue attributes 608 include, for example, 1) the complexity of the issue being reported, and 2) the determination as to whether the issue is a repeating issue with the customer.

In certain embodiments, the customer support agent receives one or more scores relating to the voice analytics. FIG. 6 illustrates some examples of outputs that may be scored, either singly or in combination. In the example shown in FIG. 6, the AI/ML voice analytics model 602 may provide data relating to one or more of 1) adherence to a script at various portions of the voice call 610, 2) customer support agent vocabulary levels 612, 3) ease of communication 614, 4) crosstalk by customer support agent 616, 5) distraction levels of the customer support agent 618, 6) the ability of the customer support agent to understand issues 620, and 7) the ability of the customer support agent to ask the customer questions 622. Based on the teachings of the present disclosure, it will be recognized that other scores and input factors may be used to assess the performance of the customer support agent.

Figure 7:
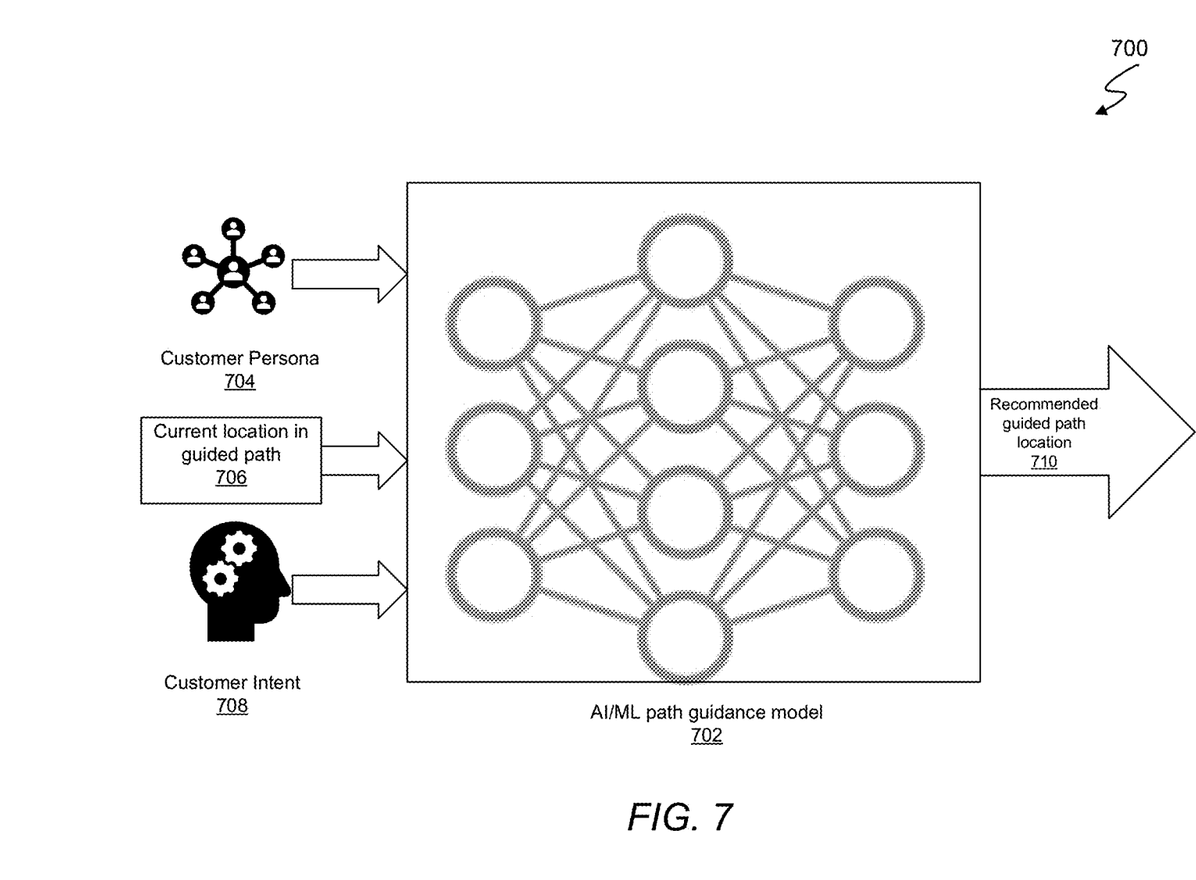
FIG. 7 depicts a functional diagram of an exemplary embodiment of an AI/ML guidance model.

As noted, the AI/ML benchmark scoring model 402 may receive information regarding the fixed paths and, if available, custom guided paths that the customer support agent may be used to guide the agent and/or customer through paths that are tailored to the customer. FIG. 7 depicts a functional diagram 700 of an exemplary embodiment of an AI/ML guidance model 702 as well as exemplary input data and output data. In at least one embodiment, the AI/ML path guidance model 702 receives data relating to a customer persona 704 (characteristics of the customer), current location in a guided path 706, and the customer intent 708.

Figure 8:
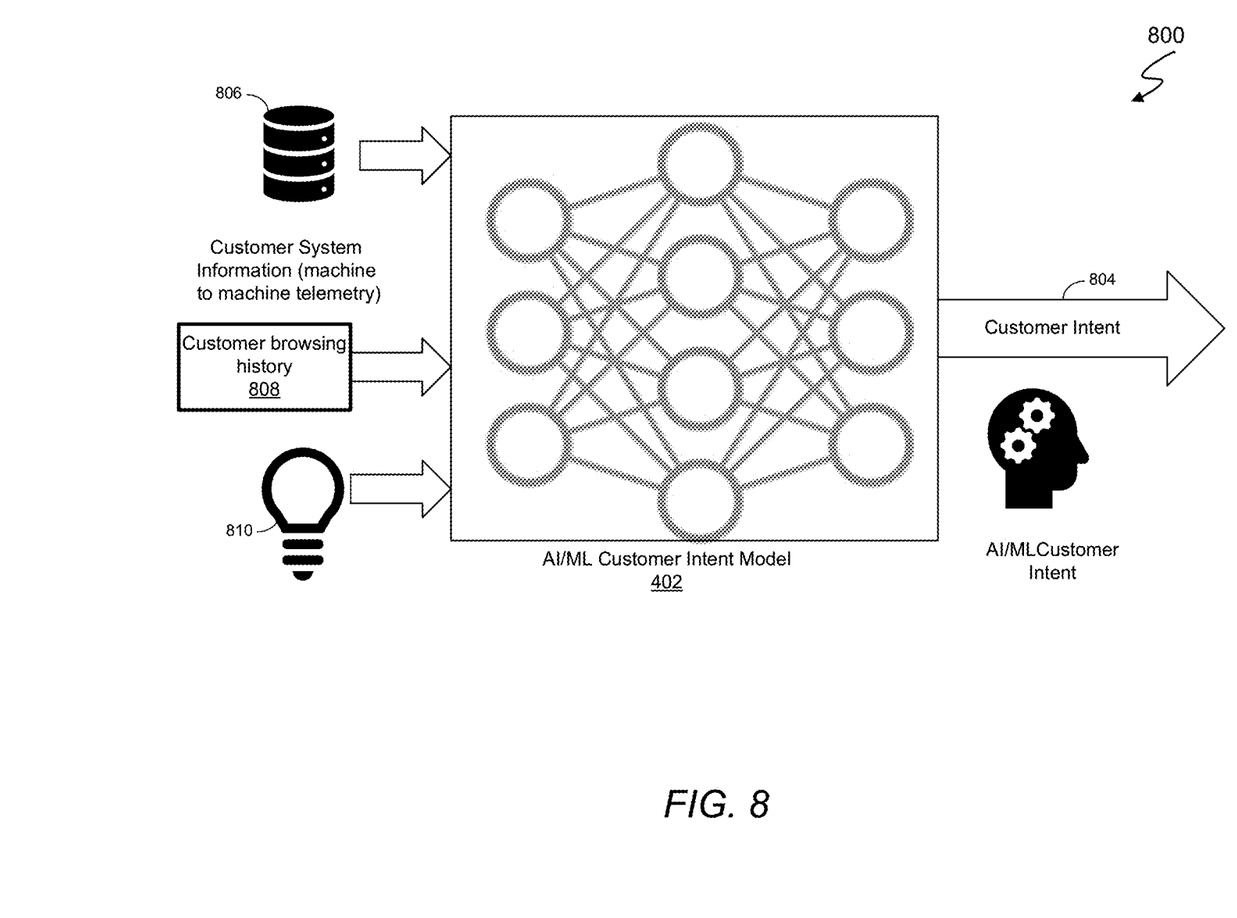
FIG. 8 is a functional diagram of an exemplary embodiment of an AI/ML customer intent model.

FIG. 8 is a functional diagram 800 of an exemplary embodiment of an AI/ML customer intent model 802. In this example, the AI/ML customer intent model 802 is trained to provide data 804 defining customer intent based on current and historical customer actions. In certain embodiments, the AI/ML customer intent model 802 provides a measure of the mindset of the customer and the likely reason that the customer is seeking customer assistance. In certain embodiments, the AI/ML customer intent model 802 receives system information data 806 corresponding to the systems used by the customer. For example, the system information data 806 may include identification of the products used by the customer. In one example, the system information is provided through machine-to-machine telemetry in which products of the customer are locally and/or remotely monitored.

The AI/ML customer intent model 802 may also consume the customer's browsing history. In one example, the browsing history may indicate that the customer intends to seek the service of a product. In another example, the browsing history may indicate that the customer intends to purchase a product. In another example, the browsing history may indicate that the customer intends to obtain articles and/or white papers relating to a product. In certain embodiments, the customer browsing history 808 may include data relating to the customer's browsing activity occurring during an initial portion of the customer's session with the customer service site. For example, the customer's initial browsing activity may indicate that the customer is already engaging the customer service site with an intent that can be derived from the first set of webpages initially accessed by the customer.

In certain embodiments, AI/ML customer intent model 802 may consume historical resolution data 810. Exemplary historical resolution data 810 may include data regarding the types of issues previously presented and/or handled by the customer and the manner in which they were resolved and/or reasons they were not resolved.

With reference again to FIG. 7, certain embodiments of the AI/ML path guidance model 702 consume data that may be used to recommend locating the customer at one or more processes in a fixed process path. In one example, the recommended processes may include skipping and/or adding process steps along the fixed path. Additionally, or in the alternative, the recommended processes may include traversing the current fixed path to join a process along a different fixed path. In certain embodiments, the customer may choose which of the recommended process paths the customer desires to travel. Additionally, or in the alternative, the customer may be automatically directed to the recommended process path.

As noted, types of information may be consumed by the AI/ML path guidance model 702 to provide the recommended next process location 710 that is tailored to the needs of the customer thereby providing a better experience for the customer than customer service systems that solely provide a fixed path to the customer. The exemplary data shown in FIG. 7 includes one or more of 1) the customer persona 704 of the customer engaging the customer service system, 2) the location 706 at which the customer is currently engaging the process along the process path, and/or 3) the customer intent 708 of the customer.

Figure 9:
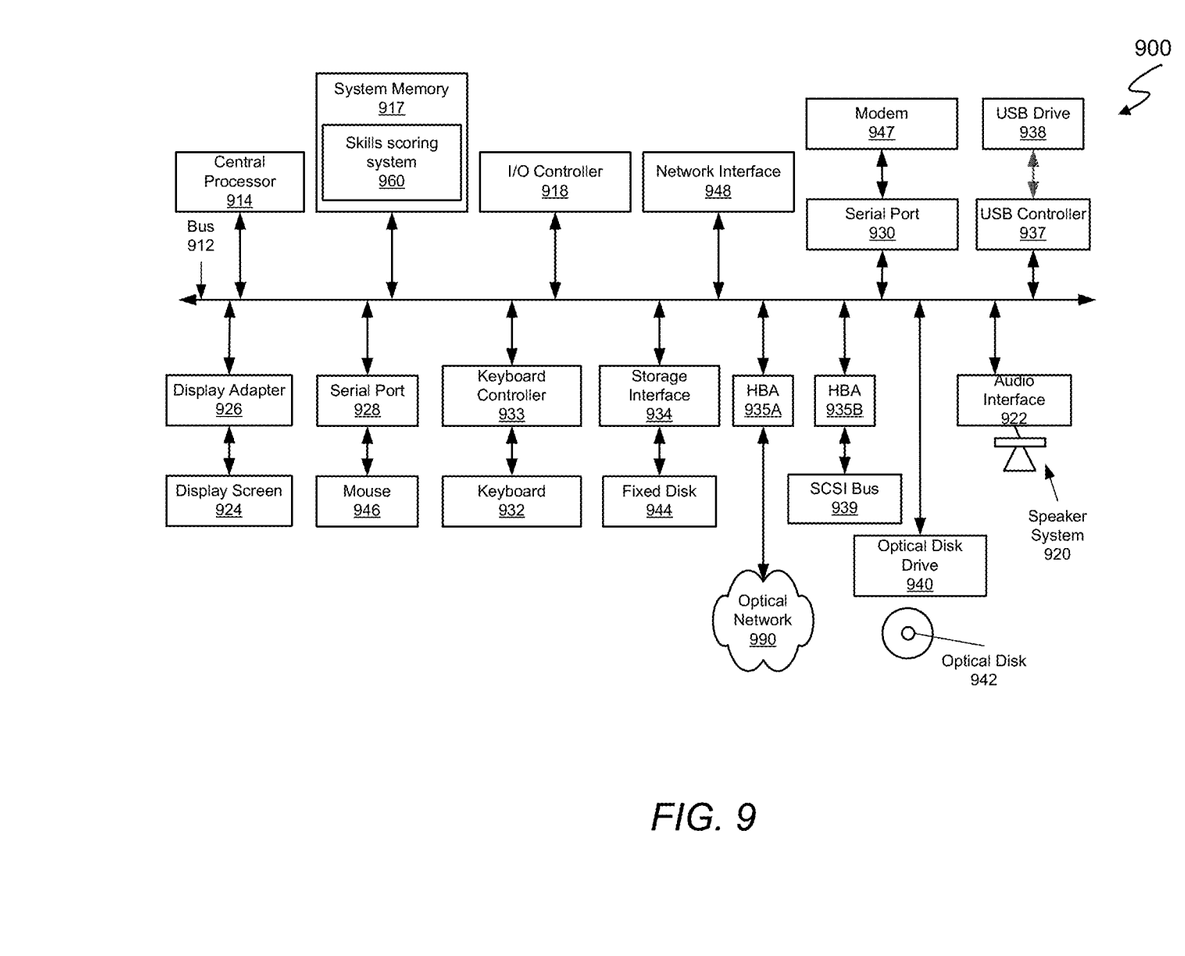
FIG. 9 depicts a block diagram of a computer system suitable for implementing various aspects of the disclosed system.

FIG. 9 depicts a block diagram of a computer system 900 suitable for implementing aspects of the systems described herein, and so can be viewed as an example of a computing device supporting a skills scoring system 960. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a USB controller 937 operative to receive a USB drive 938, a host bus adapter (HBA) interface card 935A operative to connect with an optical network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 910 are generally stored on and accessed from a computer-readable storage medium, such as a hard disk drive (e.g., fixed disk drive 944), an optical drive (e.g., optical drive 940), a universal serial bus (USB) controller 937, or other local or remote computer-readable storage medium.

Storage interface 934, as with the other storage interfaces of computer system 910, can connect to a standard computer-readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 9 need not be present to practice the systems described herein. The devices and subsystems can be interconnected in different ways from that shown in FIG. 9. The operation of a computer system such as that shown in FIG. 9 is readily known in the art and is not discussed in detail in this application. Code to implement portions of the systems described herein can be stored in computer-readable storage media such as one or more of system memory 917, fixed disk 944, optical disk 942, or floppy disk. The operating system provided on computer system 910 may be WINDOWS, UNIX, LINUX, IOS, or other operating system. To this end, system memory 917 is depicted in FIG. 9 as storing code implementing a skills scoring system 960 in the manner discussed herein.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for assessing skills of a customer support agent using one or more Artificial Intelligence/Machine Learning (AI/ML) models, the method comprising:
   establishing, by a computer system, one or more benchmarks against which a performance of the customer support agent is to be measured, wherein the one or more benchmarks are derived directly and/or indirectly through analysis of historical customer service data by an AI/ML benchmark model;
   identifying, by the computer system, a start and end time for an introductory phase, a start and end time for a solution phase, and a start and end time for a resolution phase of a customer call;
   monitoring, by the computer system, data relating to performance of the customer support agent during the customer call, wherein the monitored data includes:

introductory phase data including a length of time determined for an introduction from the customer support agent to a customer based on the start and end time for the introductory phase, wherein the length of time for the introduction measures an ability of the customer support agent to complete the introductory phase of the customer call;

issue identification data including a length of time determined for the customer support agent to identify issues presented by the customer based on the start and end time for the solution phase, wherein the length of time for identifying issues measures an ability of the customer support agent to identify the issues presented during the solution phase of the customer call;

path traversal data including a length of time determined for the customer support agent to follow a process path based on the start and end time for the solution phase, wherein the length of time to follow the process path measures an ability of the customer support agent to follow the process path, and wherein the process path includes processes to lead the customer support agent through interactions intended to resolve the issues presented during the solution phase of the customer call; and resolution data including a length of time determined for the customer support agent to close the customer call based on the start and end time for the resolution phase, wherein the length of time to close the customer call measures an ability of the customer support agent to close the customer call during the resolution phase of the customer call after solving the issues of the customer; and using, by the computer system, the AI/ML benchmark model to determine one or more benchmark scores based on comparing the monitored data and the historical customer service data, wherein the AI/ML benchmark model is trained to compare the monitored data and the historical customer service data based on the length of time for the introduction, the length of time for identifying issues, the length of time to follow the process path, and the length of time to close the customer call, and wherein the benchmark scores identify whether the customer support agent is meeting the one or more benchmarks during the introductory phase of the customer call, the solution phase of the customer call, and the resolution phase of the customer call.

2. The computer-implemented method of claim 1, further comprising:
applying the one or more benchmark scores of the customer support agent to an AI/ML training model to identify types of training needed by the customer support agent to meet the one or more benchmark scores.

3. The computer-implemented method of claim 1, wherein
at least one of the benchmark scores corresponds to a voice analytics score assessing vocal interactions between the customer support agent and a customer in the customer call.

4. The computer-implemented method of claim 3, wherein
the vocal interactions include customer support agent attributes including one or more of:
sensed tension level in a voice of the customer support agent;
ability of the customer support agent to follow a script when introducing and closing the customer call;
technical jargon of the customer support agent;
the ability of the customer support agent to maintain attention levels during the customer call; and/or
long unexplained pauses by the customer support agent during the customer call; and
the vocal interactions include customer attributes including one or more of:
patience level;
technical jargon used by the customer during the customer call;
cuss words used by the customer;
ability of the customer to focus during the customer call; and/or
sensed tension level in the voice of the customer.

5. The computer-implemented method of claim 1, wherein
establishing the one or more benchmarks includes,
providing historical data to an AI/ML historical analysis model, wherein the AI/ML historical analysis model executes unsupervised learning operations;
identifying clusters of data provided by the AI/ML historical analysis model;
applying a linear regression analysis to the identified clusters; and
classifying one or more of the identified clusters for use in training the AI/ML benchmark model.

6. The computer-implemented method of claim 1, wherein
the one or more benchmarks include,
time taken by the customer support agent to complete the introductory phase of the customer call;
time taken by the customer support agent to follow a process path, wherein the process path includes processes to lead the customer support agent through interactions intended to resolve issues presented in the customer call; and
time taken by the customer support agent to close the customer call after solving the issues of the customer.

7. The computer-implemented method of claim 6, wherein
the process path includes a guided process path.

8. A computer system comprising:
one or more information handling systems, wherein the one or more information handling systems include:
a processor;
a data bus coupled to the processor; and
a non-transitory, computer-readable storage medium embodying computer program code, the non-transitory, computer-readable storage medium being coupled to the data bus;
wherein the computer program code included in one or more of the information handling systems is executable by the processor of the information handling system so that the information handling system, alone or in combination with other information handling systems, executes operations comprising:
establishing one or more benchmarks against which a performance of a customer support agent is to be measured, wherein the one or more benchmarks are derived directly and/or indirectly through analysis of historical customer service data by an Artificial Intelligence/Machine Learning (AI/ML) benchmark model;

identifying a start and end time for an introductory phase, a start and end time for a solution phase, and a start and end time for a resolution phase of a customer call;

monitoring data relating to performance of the customer support agent during the customer call, wherein the monitored data includes:

introductory phase data including a length of time determined for an introduction from the customer support agent to a customer based on the start and end time for the introductory phase, wherein the length of time for the introduction measures an ability of the customer support agent to complete the introductory phase of the customer call;

issue identification data including a length of time determined for the customer support agent to identify issues presented by the customer based on the start and end time for the solution phase, wherein the length of time for identifying issues measures an ability of the customer support agent to identify issues presented during the solution phase of the customer call;

path traversal data including a length of time determined for the customer support agent to follow a process path based on the start and end time for the solution phase, wherein the length of time to follow the process path measures an ability of the customer support agent to follow the process path, and wherein the process path includes processes to lead the customer support agent through interactions intended to resolve the issues presented during the solution phase of the customer call; and resolution data including a length of time determined for the customer support agent to close the customer call based on the start and end time for the resolution phase, wherein the length of time to close the customer call measures an ability of the customer support agent to close the customer call during the resolution phase of the customer call after solving the issues of the customer; and using the AI/ML benchmark model to determine one or more benchmark scores based on comparing the monitored data and the historical customer service data, wherein the AI/ML benchmark model is trained to compare the monitored data and the historical customer service data based on the length of time for the introduction, the length of time for identifying issues, the length of time to follow the process path, and the length of time to close the customer call, and wherein the benchmark scores identify whether the customer support agent is meeting the one or more benchmarks during the introductory phase of the customer call, the solution phase of the customer call, and the resolution phase of the customer call.

9. The system of claim 8, further comprising:
applying the one or more benchmark scores of the customer support agent to an AI/ML training model to identify types of training needed by the customer support agent to meet the one or more benchmark scores.

10. The system of claim 8, wherein
at least one of the benchmark scores corresponds to a voice analytics score assessing vocal interactions between the customer support agent and a customer in the customer call.

11. The system of claim 10, wherein
the vocal interactions include customer support agent attributes including one or more of:
sensed tension level in a voice of the customer support agent;
ability of the customer support agent to follow a script when introducing and closing the customer call;
technical jargon of the customer support agent;
the ability of the customer support agent to maintain attention levels during the customer call; and/or
long unexplained pauses by the customer support agent during the customer call; and
the vocal interactions include customer attributes including one or more of:
patience level;
technical jargon used by the customer during the customer call;
cuss words used by the customer;
ability of the customer to focus during the customer call; and/or
sensed tension level in a voice of the customer.

12. The system of claim 8, wherein
establishing the one or more benchmarks includes,
providing historical data to an AI/ML historical analysis model, wherein the AI/ML historical analysis model executes unsupervised learning operations;
identifying clusters of data provided by the AI/ML historical analysis model;
applying a linear regression analysis to the identified clusters; and
classifying one or more of the identified clusters for use in training the AI/ML benchmark model.

13. The system of claim 8, wherein
the one or more benchmarks include,
time taken by the customer support agent to complete the introductory phase of the customer call;
time taken by the customer support agent to follow a process path, wherein the process path includes processes to lead the customer agent through interactions intended to resolve issues presented in the customer call; and
time taken by the customer support agent to close the customer call after solving the issues of the customer.

14. The system of claim 13, wherein
the process path includes a guided process path.

15. A non-transitory, computer-readable storage medium embodying computer program code, the computer program code comprising computer executable instructions configured for:
establishing one or more benchmarks against which a performance of a customer support agent is to be measured, wherein the one or more benchmarks are derived directly and/or indirectly through analysis of historical customer service data by an Artificial Intelligence/Machine Learning (AI/ML) benchmark model;
identifying a start and end time for an introductory phase, a start and end time for a solution phase, and a start and end time for a resolution phase of a customer call;
monitoring data relating to performance of the customer support agent during the customer call, wherein the monitored data includes:

introductory phase data including a length of time determined for an introduction from the customer support agent to a customer based on the start and end time for the introductory phase, wherein the length of time for the introduction measures an ability of the customer support agent to complete the introductory phase of the customer call;

issue identification data including a length of time determined for the customer support agent to identify issues presented by the customer based on the start and end time for the solution phase, wherein the length of time for identifying issues measures an ability of the customer support agent to identify issues presented during the solution phase of the customer call;

path traversal data including a length of time determined for the customer support agent to follow a process path based on the start and end time for the solution phase, wherein the length of time to follow the process path measures an ability of the customer support agent to follow the process path, and wherein the process path includes processes to lead the customer support agent through interactions intended to resolve the issues presented during the solution phase of the customer call; and resolution data including a length of time determined for the customer support agent to close the customer call based on the start and end time for the resolution phase, wherein the length of time to close the customer call measures an ability of the customer support agent to close the customer call during the resolution phase of the customer call after solving the issues of the customer; and using the AI/ML benchmark model to determine one or more benchmark scores based on comparing the monitored data and the historical customer service data, wherein the AI/ML benchmark model is trained to compare the monitored data and the historical customer service data based on the length of time for the introduction, the length of time for identifying issues, the length of time to follow the process path, and the length of time to close the customer call, and wherein the benchmark scores identify whether the customer support agent is meeting the one or more benchmarks during the introductory phase of the customer call, the solution phase of the customer call, and the resolution phase of the customer call.

16. The non-transitory, computer-readable storage medium of claim 15, further comprising:
applying the one or more benchmark scores of the customer support agent to an AI/ML training model to identify types of training needed by the customer support agent to meet the one or more benchmark scores.

17. The non-transitory, computer-readable storage medium of claim 15, wherein
at least one of the benchmark scores corresponds to a voice analytics score assessing vocal interactions between the customer support agent and a customer in the customer call.

18. The non-transitory, computer-readable storage medium of claim 17, wherein
the vocal interactions include customer support agent attributes including one or more of:
sensed tension level in a voice of the customer support agent;
ability of the customer support agent to follow a script when introducing and closing the customer call;
technical jargon of the customer support agent;
the ability of the customer support agent to maintain attention levels during the customer call; and/or
long unexplained pauses by the customer support agent during the customer call; and
the vocal interactions include customer attributes including one or more of:
patience level;
technical jargon used by the customer during the customer call;
cuss words used by the customer;
ability of the customer to focus during the customer call; and/or
sensed tension level in the voice of the customer.

19. The non-transitory, computer-readable storage medium of claim 15, wherein
establishing the one or more benchmarks includes,
providing historical data to an AI/ML historical analysis model, wherein the AI/ML historical analysis model executes unsupervised learning operations;
identifying clusters of data provided by the AI/ML historical analysis model;
applying a linear regression analysis to the identified clusters; and
classifying one or more of the identified clusters for use in training the AI/ML benchmark model.

20. The non-transitory, computer-readable storage medium of claim 15, wherein
the one or more benchmarks include,
time taken by the customer support agent to complete the introductory phase of the customer call;
time taken by the customer support agent to follow a process path, wherein the process path includes processes to lead the customer support agent through interactions intended to resolve issues presented in the customer call; and
time taken by the customer support agent to close the customer call after solving the issues of the customer.

* * * * *